(12) United States Patent
Kanjo

(10) Patent No.: US 6,274,840 B1
(45) Date of Patent: Aug. 14, 2001

(54) ELECTRODE POSITION DETECTING SYSTEM AND METHOD FOR SPOT WELDERS

(75) Inventor: Mitsunori Kanjo, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/240,708

(22) Filed: Feb. 2, 1999

(30) Foreign Application Priority Data

Feb. 4, 1998 (JP) .................................. P10-23335

(51) Int. Cl.$^7$ .................................. B23K 11/10
(52) U.S. Cl. .................................. 219/86.41; 219/91.9
(58) Field of Search .................................. 219/91.1, 109, 219/110, 86.41; 228/102; 318/568

(56) References Cited

U.S. PATENT DOCUMENTS

| | | | | |
|---|---|---|---|---|
| 4,151,451 | * | 4/1979 | Maertins | 318/568 |
| 4,567,347 | * | 1/1986 | Ito | 219/124.34 |
| 4,973,814 | * | 11/1990 | Kojma | 219/110 |
| 5,192,845 | * | 3/1993 | Kirmsse | 219/110 |
| 5,405,075 | * | 4/1995 | Narita | 219/91.1 |

* cited by examiner

Primary Examiner—Clifford C. Shaw
(74) Attorney, Agent, or Firm—McDermott, Will & Emery

(57) ABSTRACT

A welding gun has a coordinate system fixed thereto, and a sensor is fixed to the coordinate system. The sensor senses a mobile electrode moved in a position, and a position detector cooperates with the sensor to detect the position of the mobile electrode relative to the welding gun.

15 Claims, 10 Drawing Sheets

GUN BENDING

PRESS FORCE VARIATION

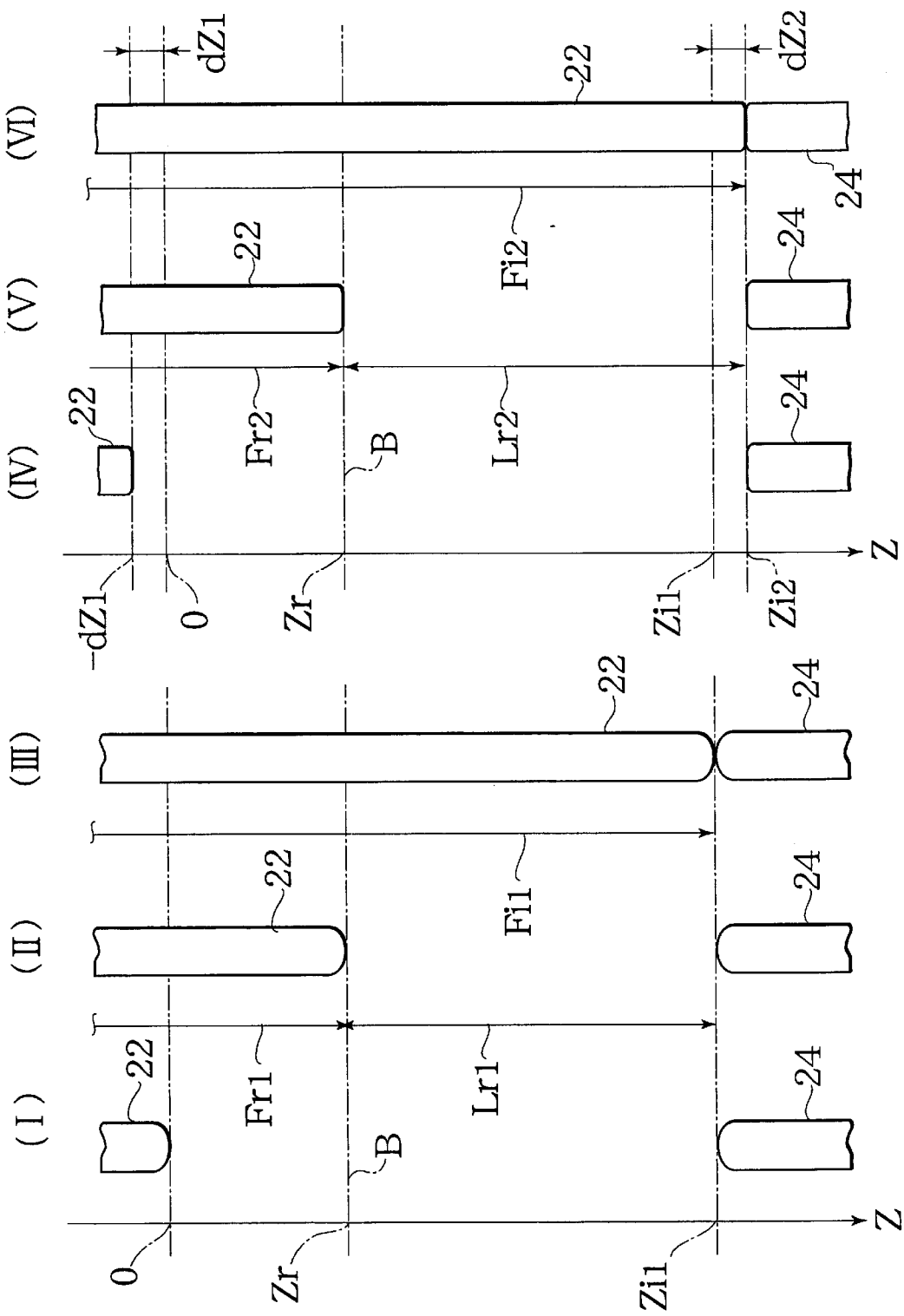

ELECTRODE POSITION DETECTING SYSTEM AND METHOD FOR SPOT WELDERS

BACKGROUND OF THE INVENTION

The present invention relates to an electrode position detecting system and method for spot welders. In particular, the invention relates to an electrode position detecting system and method for spot welders in which a welding robot is responsible for carrying, handling and/or manipulation (hereafter collectively "manipulation") of a welding gun that has a pair of relatively movable welding electrodes for pinching, and conducting a welding current through, a spot of work to be thereby welded, wherein a position of a mobile welding electrode (hereafter called "mobile electrode") is detected by a position detector for measurement, analysis and/or control purposes, such as for measurement or analysis of inter-electrode distance or electrode deformation or abrasion, analysis on electrical or mechanical characteristics or performances, correction of electrode feed or inter-electrode distance, compensation such as for an orientation or bend of a manipulated welding gun, or control of welding quality.

A conventional spot welder has an electrode position detecting system in which: a mobile electrode is moved by a servo motor; a sensing element senses the electrode in a position after movement; and a position detector is responsible for servo control data associated with the movement to detect the position of the electrode.

The sensing element is fixed to a measuring installation placed on a foundation on which a welding robot is installed for manipulation of a welding gun.

SUMMARY OF THE INVENTION

In view of the inventor, the foundation has a conforming level defined in an absolute coordinate system, as the robot is operative in a mobile coordinate system bound to the absolute coordinate system, and the measuring installation is furnished on the foundation with a severe check for the sensing element to have a precise fixed position to the absolute coordinate system, permitting a position of the electrode to be accurately measured in the absolute coordinate system.

In spot welders in which a welding spot has a defined absolute position, a measured absolute position of an electrode is directly employable for position control relative to the welding spot. For the concerned purposes, however, the measured position is precisely analyzed for conversion to determine an electrode position relative to the gun which is manipulated by the robot.

It appeared to the inventor that severe requirements have been provided for such checks and analyses. However, should such requirements have to be provided?

Moreover, manipulation of the gun in the reference coordinate system is frequently interrupted by a significant interval of time for sensing the electrode in the absolute coordinate system.

The invention has been achieved with such points in view.

It therefore is an object of the invention to eliminate redundant conventional requirements in the field of endeavor described. It also is an object of the invention to eliminate conventional frequent interruption of gun manipulation.

To achieve the object, an aspect of the invention provides an electrode position detecting system for spot welders in which a welding robot manipulates a welding gun having a pair of relatively movable welding electrodes, the electrode position detecting system comprising a coordinate system fixed to a welding gun, a sensor fixed to the coordinate system, the sensor sensing a mobile electrode moved in a position, and a position detector cooperative with the sensor to detect the position of the mobile electrode relative to the welding gun.

According to the aspect of the invention, a mobile electrode in a moved position is sensed by a sensor fixed to a coordinate system, and a position detector detects the moved position of the electrode relative to a welding gun. The position detector may calculate servo control data on movement of the electrode for detection of the electrode position.

As the coordinate system is fixed to the gun, the position of the sensed electrode is directly detected in terms of a relative position to the gun, without the need of conventional severe requirements for furnishing a measuring installation nor conventional frequent interruption of gun manipulation for a sensing in an absolute coordinate system.

Further, to achieve the object described, another aspect of the invention provides an electrode position detecting method for spot welders in which a welding robot manipulates a welding gun having a pair of relatively movable welding electrodes, the electrode position detecting method comprising having a coordinate system fixed to a welding gun, fixing a sensor to the coordinate system, sensing by the sensor a mobile electrode moved in a position, and having a position detector cooperating with the sensor to detect the position of the mobile electrode relative to the welding gun.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 13A is an illustration describing a principle of electrode position detection by the detecting system of FIG. 1, and a fundamental use of the principle for measurement of an inter-electrode distance; and FIG. 13B is an illustration describing an application of the principle of electrode position detection to a measurement of electrode deformation.

DETAILED DESCRIPTION OF THE PREFERRED EMBODIMENTS

Figure 1:
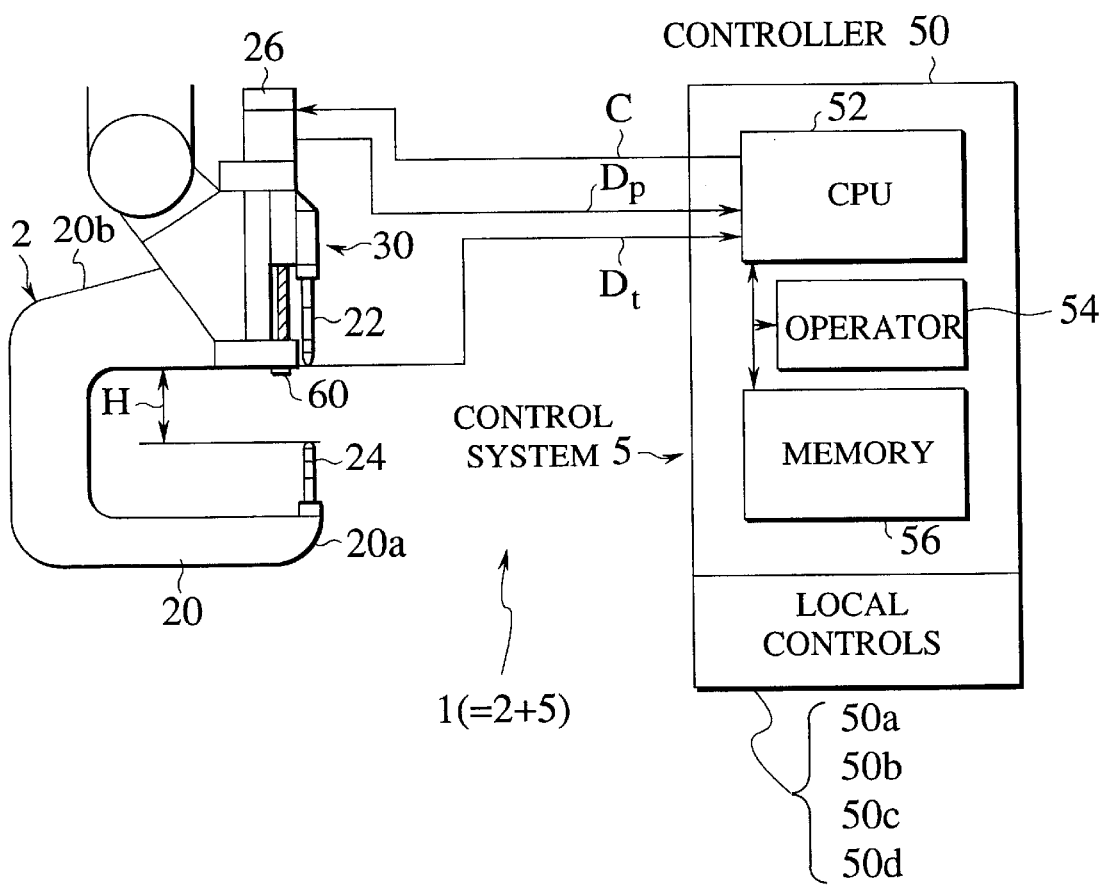
FIG. 1 is a side view, partly in block diagram, of an electrode position detecting system according to an embodiment of the invention, showing a welding gun in a schematic form.

There will be detailed below the preferred embodiments of the present invention with reference to the accompanying drawings. Like members are designated by like reference characters.

Figure 8:
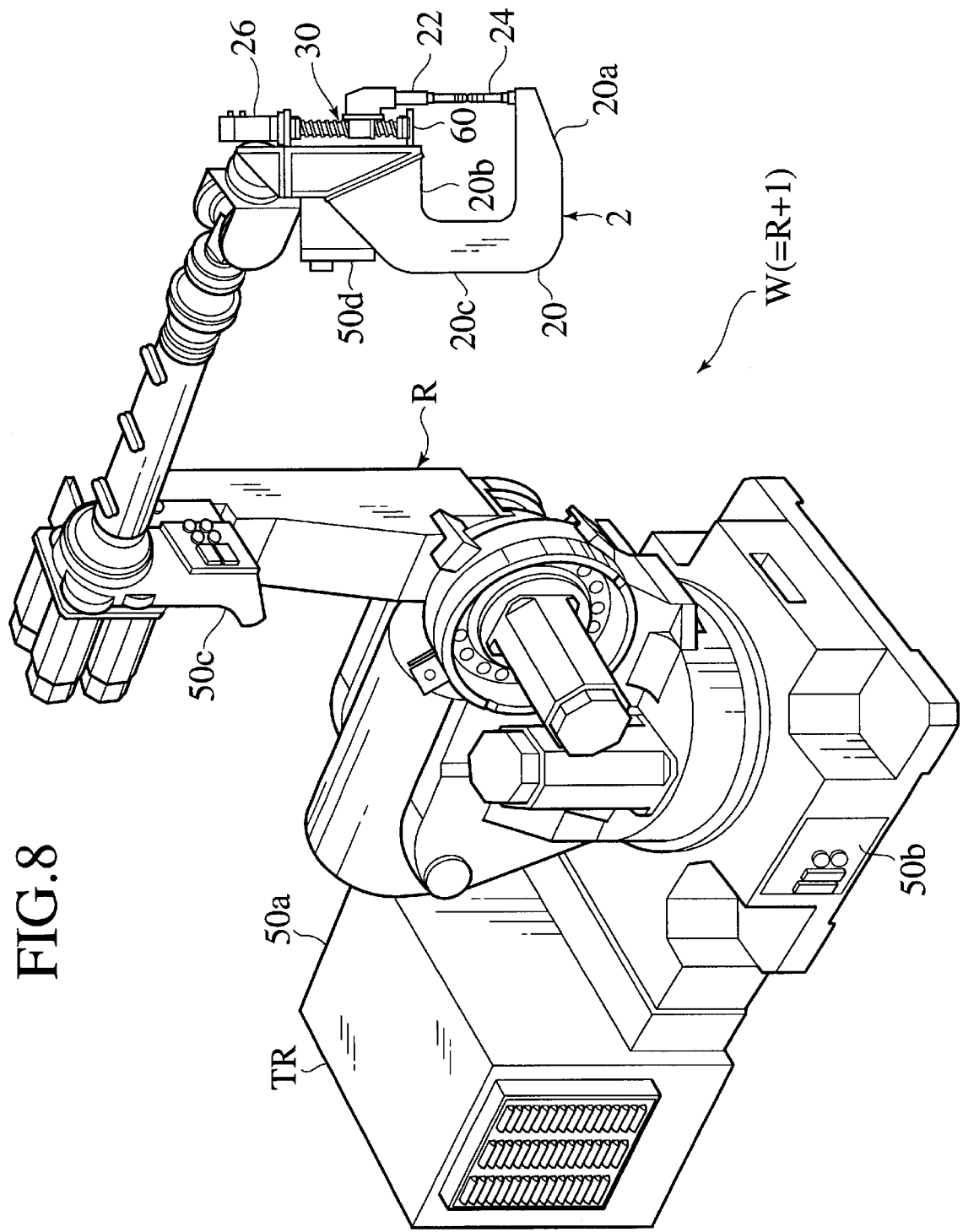
FIG. 8 is a perspective view of a spot welder including the electrode position detecting system of FIG. 1, showing the welding gun in a schematic form.
Figure 9:
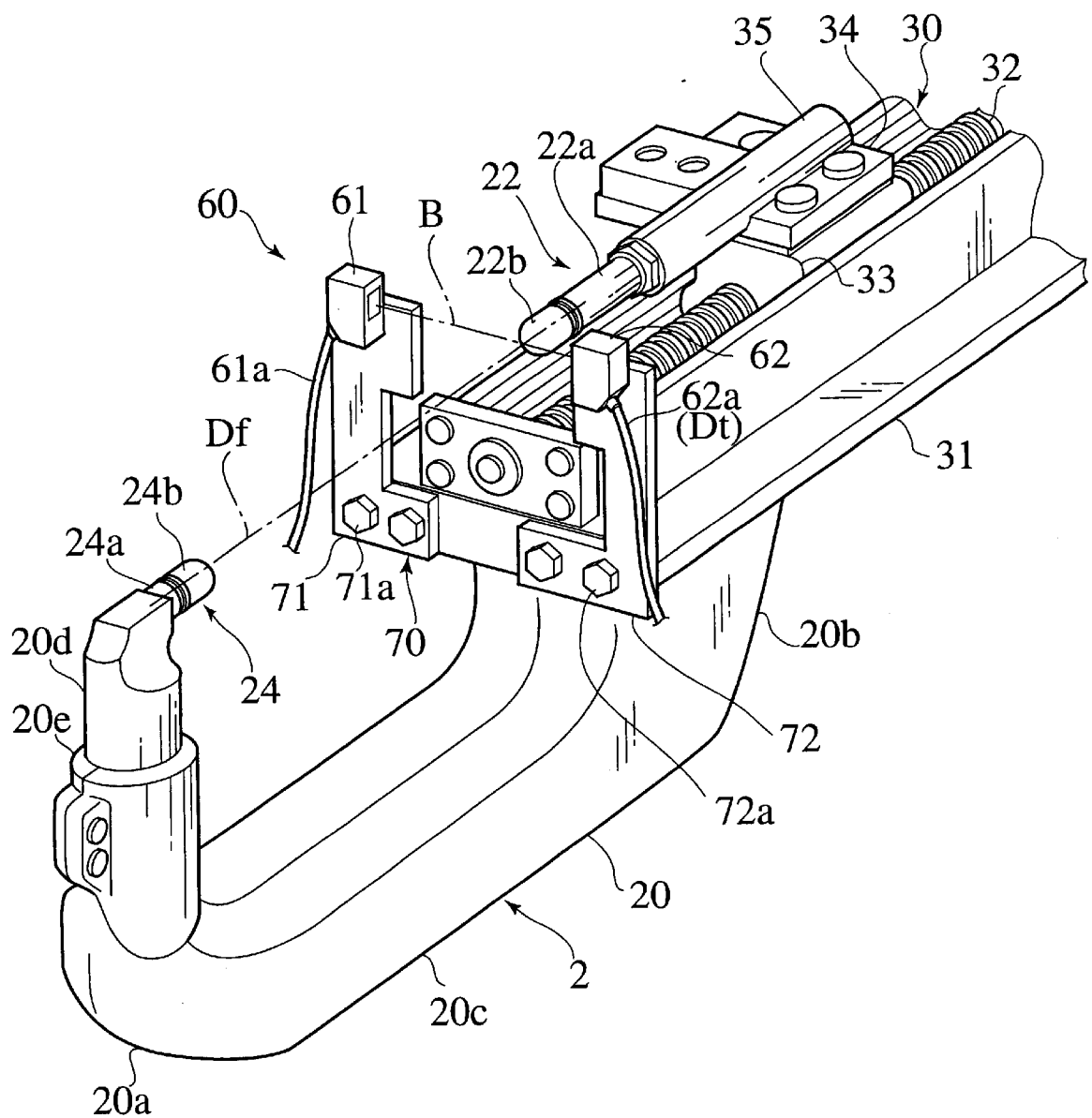
FIG. 9 is a detail of the welding gun of the spot welder of FIG. 8.

FIG. 1 shows an electrode position detecting system 1 according to an embodiment of the invention, including a welding gun 2 detailed in FIG. 9, and FIG. 8 shows a spot welder W employing the detecting system 1.

As shown in FIG. 1, the electrode position detecting system 1 comprises the welding gun 2 and a control system 5, both in terms of a collective pronoun of associated component elements. As shown in FIG. 8, the spot welder W comprises the detecting system 1 and a welding robot R which includes the gun 2 in terms of hardware. For comprehension, the spot welder W of FIG. 8 is embodied as a robot type that has a separate welding transformer TR placed on a foundation. The robot welder W may preferably be a compact type in which a welding gun carries or holds a compact welding transformer.

As shown in FIG. 8, the spot welder W comprises: the welding robot R which is furnished on the foundation and manipulates the welding gun 2; the control system 5 which includes a controller 50 as a console (not shown) for the welder W, and a set of locally centralized or distributed operation and/or control panels 50a, 50b, 50c, 50d such as in front of the transformer TR and at the robot R and gun 2; and facilities or implements (not shown) of necessary power and fluid sources, electric and/or optic cables, communication and control lines and data interfaces, hydraulic and/or pneumatic lines suspended from overhead rails, air conditioner, and coolant circuitry including suspended electrode-coolant hoses.

As shown in FIG. 1, the controller 50 has a central processing unit (hereafter called "CPU") 52 for controlling the spot welder W, an arithmetic operator 54 for fast arithmetic operation, and one or more memories (hereafter collectively called "memory") 56 for storing necessary programs and associated data.

As shown in FIG. 8, the welding gun 2 is attached to an end of a multiple-degree-of-freedom arm of the welding robot R, which manipulates the welding gun 2 to be controlled in position (location and orientation) three-dimensionally so that a pair of relatively movable welding electrodes, i.e. combination of a mobile electrode 22 and a stationary welding electrode (hereafter called "stationary electrode") 24, are set in their initial positions for a respective spot welding.

As shown in FIGS. 8 and 9, the mobile and stationary electrodes 22, 24 are assembled to the welding gun 2. More specifically, the gun 20 comprises: a gun body 20 called "gun arm", which is shaped in a bow or C-form that has an arm end portion 20a, an arm base portion 20b and an intermediate portion 20c therebetween; a feed mechanism 30 mounted on or supported by the arm base portion 20b; a servo motor 26 fastened to the arm base portion 20b, for driving the feed mechanism 30; the mobile electrode 22 which can be moved or fed by the feed mechanism 30 in each sense of a feed direction Df of the mechanism; the stationary electrode 24 which is mounted on or supported by the arm end portion 20a, in opposition to the mobile electrode 22; and an electrode sensor 60 incorporated to the gun 2 by fixing to the gun arm 20 with a bracket set 70. The arm end portion 20a includes an electrode holder 20d and a water jacket 20e. The gun body 20 has coolant paths formed therethrough for passing coolant (water) and connected to the coolant hoses, and a conductor provided therethrough for conducting a welding current.

The feed mechanism 30 comprises: a mount base 31 fixed to the arm base portion 20b; a ball screw 32 operatively mounted to the mount base 31, oriented to extend in the feed direction Df, and coupled (directly or via a reduction) with a drive shaft of the servo motor 26; a nut member 33 mounted on and meshing with the ball screw 32; a slide base 34 mounted on the nut member 33; and an electrode holder 35 fixed to the slide base 34, threaded inside, and formed with coolant paths connected to the coolant paths in the gun body 20.

Figure 10:
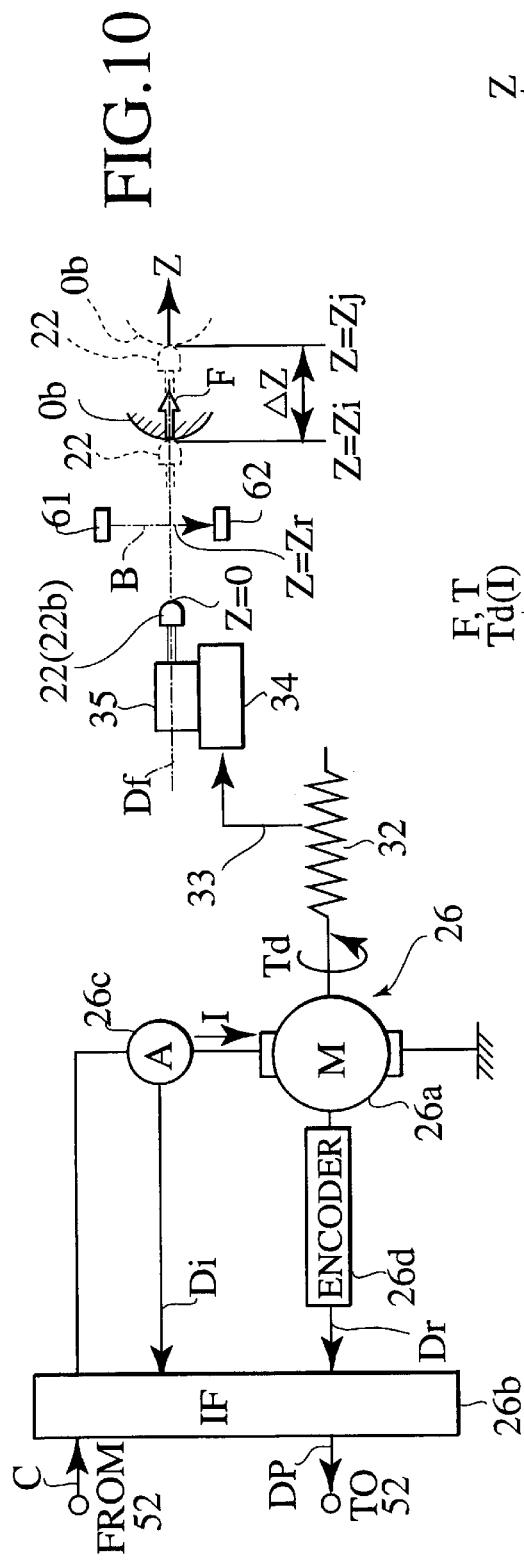
FIG. 10 is an electromechanical circuit diagram of a servo motor for the welding gun of FIG. 9.

As shown in FIG. 10, the servo motor 26 comprises a step motor 26a controlled with a motor drive command C (see FIG. 1) input from the CPU 52 to an interfacing control 26b, so that a motor drive current I is conducted from the control 26b through the step motor 26a in accordance with the command C.

In the embodiment, for comprehension, the motor current I is measured as an amperage data Di by a current meter 26c, and a current rotation of the step motor 26a is detected as a rotation data Dr by an encoder 26d. In a preferred modification, the motor current I may not be measured, as the drive command C can substitute it in the CPU 52.

The amperage data Di and the rotation data Dr are multiplexed at the control 26b, and sent as an electrode position data Dp (see FIG. 1) to the controller 50, where it is demultiplexed to the respective data Di and Dr. Then, the rotation data Dr is input to the CPU 52, where it is processed to calculate a current feed of the mobile electrode 22 by the feed mechanism 30. The amperage data Di permits the CPU 52 to check a later-described zero-torque point.

As in FIG. 10, the step motor 26a is operatively connected to the ball screw 32, and rotates the screw 32 with drive torque Td, driving the nut member 33, whereby the slide base 34 is moved, carrying the electrode holder 35, so that the mobile electrode 22 is fed in the feed direction Df.

Letting Z be an axis of an orthogonal coordinate system fixed to the gun arm 20, the mobile electrode 22 (more specifically, its tip end) is fed along the Z-axis from a playback or original position Z=0 to a certain advance position Z=Zi (Zi>0), where it abuts on an object Ob (e.g. a spot to be welded or the stationary electrode 24) and exerts a pressing force F on the object Ob, pushing the object Ob forward by a small distance ΔZ until the object Ob stops at a pushed position Z=Zj (Zj>Zi), where the force F is balanced (e.g. by a reaction force from the stationary electrode 24 or the arm end portion 20a of the gun arm 20 that bends a little).

Figure 11:
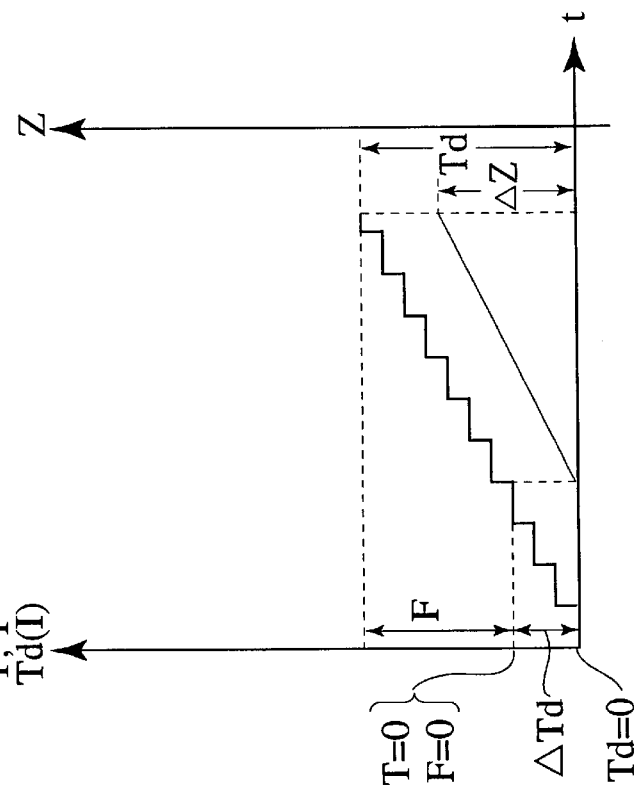
FIG. 11 is a graph of varying torque of the servo motor of FIG. 10, as the torque is represented by a motor drive current.

As shown in FIG. 11, the drive torque Td stepwise increases with an increasing motor current I. As the feed mechanism 30 has a weight, a mechanical resistance and a backlash, a fraction A Td of the drive torque T is consumed as a loss, and the rest (Td–ΔTd) is employable to exert the pressing force F, which thus has a raised zero point (F=0) corresponding to and defined by a number of steps of current increase. The zero-force point (F=0) is informed or taught to the CPU 52 in advance, so that the CPU 52 can recognize an apparent or effective fraction (Td–ΔTd) of a magnitude of the drive torque Td, as motor torque T (as used herein), within a designed range of torque magnitude including a strict zero-torque point (T=0) that corresponds to the zero-force point (F=0).

As shown in FIG. 9, the mobile electrode 22 comprises an electrically conductive adapter 22a screwed at a base end thereof to the electrode holder 35, and a pointed or round-ended electrode tip 22b dressed on a distal end of the adapter 22a.

Figure 12:
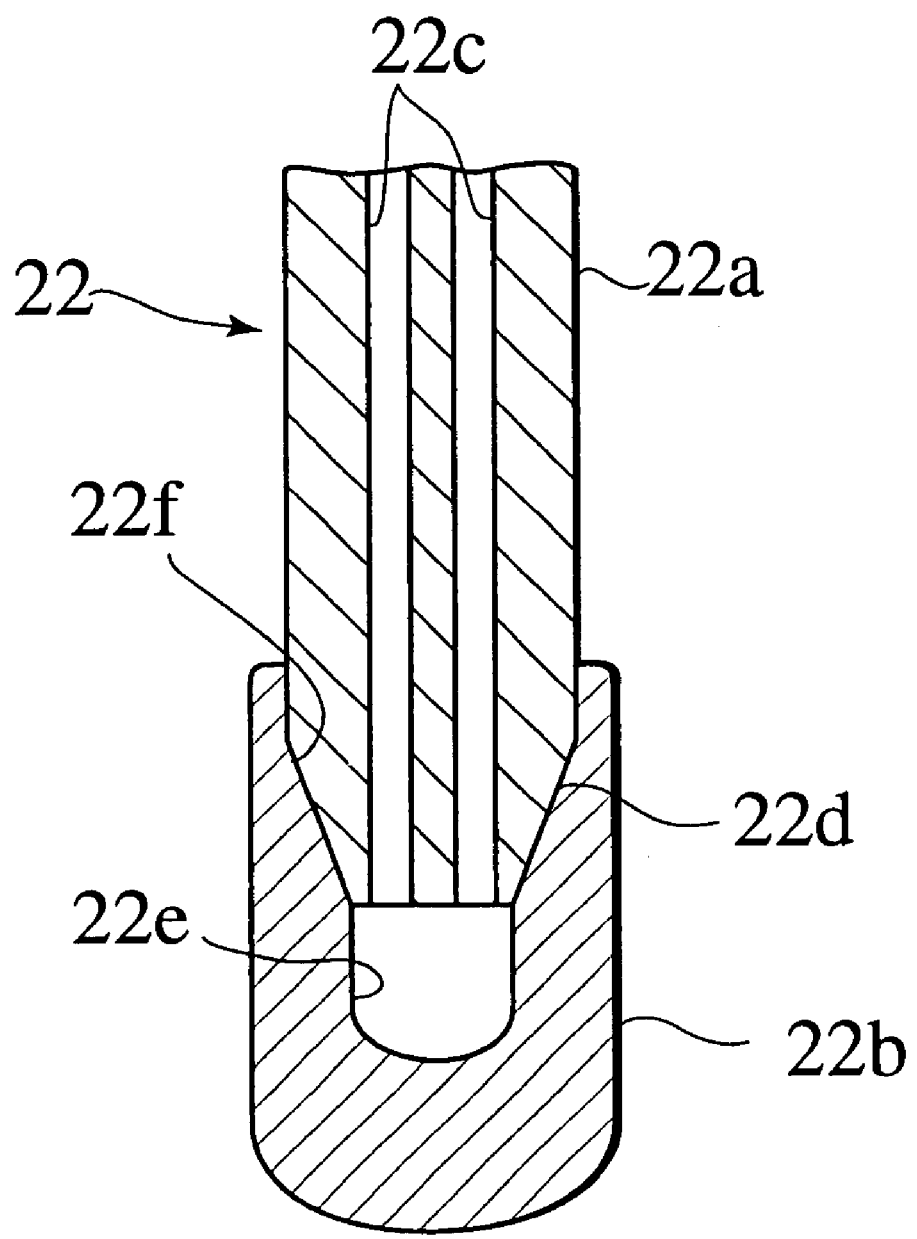
FIG. 12 is a section of a dressed end portion of a welding electrode of the welding gun of FIG. 9.

FIG. 12 is a section of an end portion of the mobile electrode 11. The adapter 22a has supply and return coolant paths 22c formed therethrough, and a radially inwardly tapered outer circumference 22d at the distal end. The electrode tip 22b is formed with a one-end-close hole or hollow 22e for coolant circulation, which has a radially outwardly tapered inner circumference 22f forcibly fitted water-tight on the outer circumference 22d of the adapter 22a. When the mobile electrode 22 is referred herein, its position is represented by a Z-axis coordinate of an end (i.e. a top profile) of the tip 22b that can be sensed by the sensor 60. The dressed tip 22b can be refitted for complete in-depth insertion by pressing the mobile electrode 22 against the stationary electrode 24 with a "permissible largest nominal force (e.g. 400 Kgf) depending on a rating of the servo motor 26 and configuration and dimensions of the adapter 22a and tip 22b" (hereafter called "maximum pressing force").

The stationary electrode 24 is likewise constituted, and comprises an electrically conductive adapter 24a screwed to the electrode holder 20d, and a pointed or round-ended electrode tip 24b forcibly dressed on the adapter 24a. When electrode 24 is referred herein, its position is represented by a Z-axis coordinate of an end of the tip 24b after abutment with the mobile electrode 22.

Coolant from either hose is circulated via the electrode tips 22b and 24b and returns to the other hose, without extra insulation, as a welding voltage is relatively low.

The electrode sensor 60 is an intact sensing type that comprises: an emitter, transmitter or projector (hereafter collectively "projector") 61 fixed relative to the arm base portion 20b, for projecting a beam B of infrared, coherent or non-coherent light crossing the feed direction Df of the mobile electrode 22 at right angles; and a photoelectric diode or transistor, optical coupling element or light-sensing receiver (hereafter collectively "receiver") 62 fixed relative to the arm base portion 20b, for receiving the beam B from the projector 61.

The projector 61 is controlled through a signal line 61a of drive command from the controller 50, i.e. by the CPU 52. The receiver 62 is connected by a signal line 62a of sensing data Dt (see FIG. 1) to the controller 50, and interfaced to the CPU 52. The receiver 62 senses a pointed or round or deformed profile at an end of the electrode tip 22b of the mobile electrode 22, when e.g. reception of a majority of rays of the beam B is interrupted by the tip end, and the sensing data Dt is input to the CPU 52, where it is processed to detect for an interrupting tip end. When the tip end is detected, the calculated current feed is read, whereby a current position of the electrode 22 is defined and detected in terms of a Z-axis coordinate of the detected tip end.

The projector 61 and the receiver 62 are both fixed by the bracket set 70 to the orthogonal coordinate system fixed to the gun2 so that, as illustrated by FIG. 10, the beam B from the projector 61 perpendicularly crosses the Z-axis at a reference point having a defined coordinate Z=Zr (0<Zr<Zi).

As shown in FIG. 9, the bracket set 70 is fastened to the arm base portion 20b, i.e. it comprises a pair of substantially C-shaped support pieces 71, 72 spaced from each other in a perpendicular direction to the feed direction Df of the mobile electrode 22 and fastened by screws 71a, 72a to the arm base portion 20b, one support piece 71 supporting the projector 61, the other support piece 72 supporting the receiver 62.

As the sensor 60 is provided, the mobile electrode 22 is given a sufficient stroke to advance from the original position Z=0 (FIG. 10) behind the sensor 60 to a stop position Z=Zj (FIG. 10), across an arm dimension H (FIG. 1) between a front face of the arm base portion 20b (FIG. 9) and the tip end of the stationary electrode 24. The stroke is larger than an arm spacing (between 20a and 20b) of the welding gun 2.

FIG. 13A illustrates a principle of electrode position detection by the detecting system 1 of FIG. 1 and a fundamental use of the principle for measurement of an inter-electrode distance, and 13B, an application of the principle of electrode position detection to a measurement of electrode deformation.

In FIG. 13A, the mobile electrode 22 (more specifically its tip 22b as an unused article) has three positions: a position (I), where it is waiting at an initial zero-feed point which is now assumed to be identical to the original point Z=O for comprehension; a position (II), where its round tip end interrupts the beam B at the reference point Z=Zr; and a position (III), where the tip end contacts and rests pressure-free on a round tip end (of the tip 24b as an unused article) of the stationary electrode 24 at an initial contact point Z=Zi1, whereas the pressure-free contact is detected in the CPU 52, as the torque-zero point (T=0) in a very short playback after initial detection of a significant pressing force F (FIG. 11) which may be the maximum pressing force.

The mobile electrode 22 is fed by the feed mechanism 30: first at a (yet uninformed) distance Zr from the position (I) to the position (II), where its (yet uninformed) tip end is sensed at the receiver 62 (FIG. 9) and detected in the CPU 52 (FIG. 1), when the CPU 52 reads a current calculated feed Fr1 as the current electrode position to be Zr; and then at a (yet uninformed) additional distance Lr1 (=Zi1−Zr) from the position (II) to the position (III), where the pressure-free contact described is detected in the CPU 52, when the CPU 52 reads a current calculated feed Fi1 (=Fr1+Lr1) as the current electrode position to be Zi1.

As a result, the CPU 52 is informed of a necessary feed Fr1 (=Zr) for the mobile electrode 22 (dressed with unused tip 22b) to reach the reference point Zr, and a reference distance Lr1 (=Zi1−Zr) as a current spacing between the mobile electrode 22 at the reference position Zr and the stationary electrode 24 (dressed with unused tip 24b), before a subsequent welding.

In FIG. 13B, the mobile electrode 22 deformed or worn by one or more welding operations again has three positions: a position (IV), where it is waiting at a current zero-feed point (−dZ1) which is short or smaller than the initial feed point Z=0 by a gap dZ1 corresponding to a degree of deformation of the electrode 22; a position (V), where its deformed tip end interrupts the beam B at the reference point Z=Zr; and a position (VI), where the tip end contacts and rests pressure-free on a deformed tip end of the stationary electrode 24 at a current contact point Z=Zi2 (=Zi1+dZ2) which is more distant than the initial contact point Zi1 by a gap dZ2 corresponding to a degree of deformation of the electrode 24.

The mobile electrode 22 is fed: first at a distance Zr+dZ1 from the position (IV) to the position (V), where its tip end is sensed at the receiver 62 and detected in the CPU 52, when the CPU 52 reads a current calculated feed Fr2 as the electrode position to be Zr; and then at an additional distance Lr2 (=Zi2−Zr) from the position (V) to the position (VI), where a pressure-free contact is detected in the CPU 52, when the CPU 52 reads a current calculated feed Fi2 (=Fr2+Lr2) as the electrode position to be Zi2.

As a result, the CPU 52 is informed of a necessary feed Fr2 (=Zr+dZ1) for the mobile electrode 22 (dressed with used tip 22b) to reach the reference point Zr, and a reference distance Lr2 as a current spacing between the mobile electrode 22 at the reference position Zr and the stationary electrode 24 (dressed with used tip 24b), after a previous welding.

As the reference position Zr is common and associated data (including at least Fr1 and Fi1 or Lr1; and Fr2 and Fi2 or Lr2) are stored in the memory 56 (FIG. 1), the CPU is allowed to read and process a voluntary set of data to determine respective degrees (dZ1, dZ2) of deformation of the electrode tips 22b and 24b, for a variety of applications, e.g. to correction or compensation of feed distance, electrode position or inter-electrode distance.

In the electrode position detecting system 1, the mobile electrode 22 serves as a graduation-free reference measure having a reference division defined thereon by the beam B from the projector 61. The measure has a defined length when fed beyond the reference point Zr.

Incidentally, the spot welder W of FIG. 9 is provided with no equalizer for automatic compensation of electrode position for a deviated position of a welding spot of work, which means the stationary electrode 24 needs to be brought into a void-free full contact at a level (hereafter sometimes called "stationary electrode contact point") with an underside of the welding, before the mobile electrode 22 touches and rests pressure-free at a level (hereafter sometimes called "mobile electrode contact point") on an upside of the welding spot.

The welding gun 2 has a designed weight in consideration of a nominal permissible load of the robot arm, and the gun arm 20 has a rigidity and strength to withstand a pressing force F acting thereon from the mobile electrode side when welding, with a slight but increasing bend, as the pressing force increases.

Figure 4:
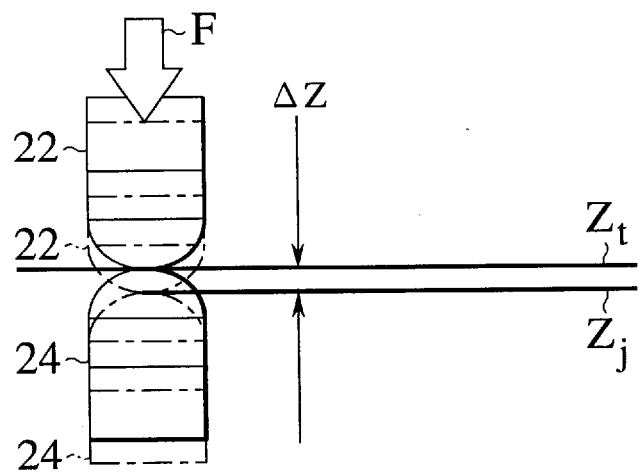
FIG. 4 is an illustration describing a deviation of electrode position in the electrode position detecting system of FIG. 1.

Accordingly, there occurs a positional deviation of the welding spot, as illustrated in FIG. 4 in which the welding spot is assumed to be a zero thickness so that the mobile electrode contact point is substantially coincides with the stationary electrode contact point, which is designated by a point Z=Zt as a theoretical pressing point. As the gun arm 20 bends with a pressing force F (several hundreds Kgf), the theoretical pressing point Zt is deviated to another point Zj spaced therefrom at a small distance ΔZ (see FIG. 10).

Further, the pressing force F slightly changes in dependence on an orientation of the welding gun 2.

The present embodiment can cope with such a positional deviation and changes of force, in addition to basic detection and correction of electrode position, as will be discussed in the following explanation in which some described elements are referred by their practical names for comprehension.

Figure 2:
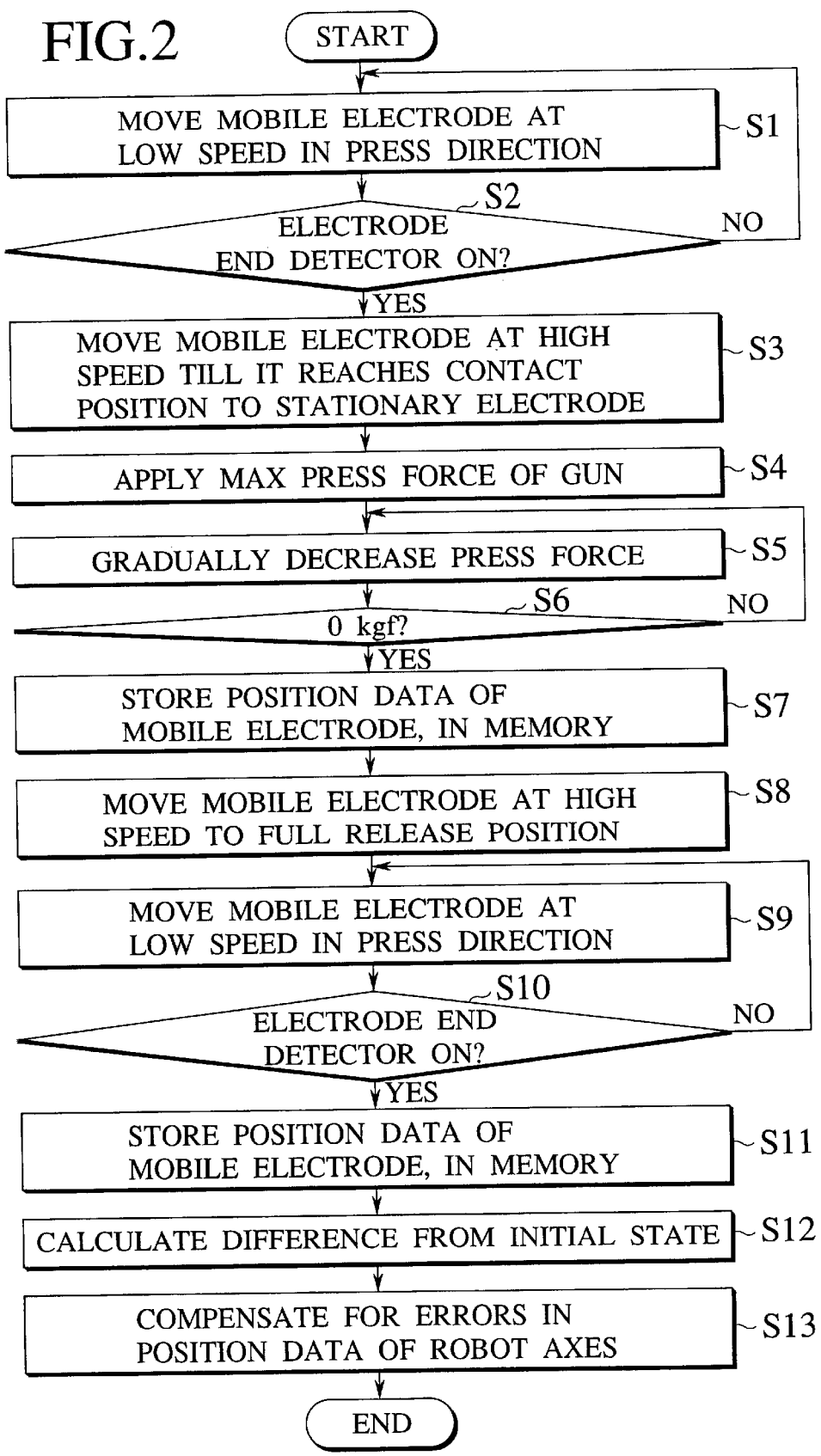
FIG. 2 is a flowchart of actions of the electrode position detecting system of FIG. 1, as it is employed for correction of electrode position to compensate for electrode abrasion.

FIG. 2 shows a flowchart of actions for basic detection and correction by the electrode position detecting system 1 of FIG. 1.

The welding gun 2 is now equipped with an unused (tip 22b for the) mobile electrode 22 and an unused (tip 24b for the) stationary electrode 24.

At a step S1, a drive command C is output from the CPU 52 of the controller 50 to the servo motor 26, with a command data defining a pressing force to be exerted by the mobile electrode 22. With the commend C given, the servo motor 26 moves the mobile electrode 22 at a low speed in a pressing direction, i.e. in the feed direction Df (FIG. 10).

At a step S2, a tip end of the mobile electrode 22 is sensed or detected by the sensor 60 employed as an electrode end detector (at Zr in FIG. 13A). Upon the detection, a current position Fr1 of the mobile electrode 22 is stored in a storage region of the memory 56 (hereafter called "memory-").

Figure 5:
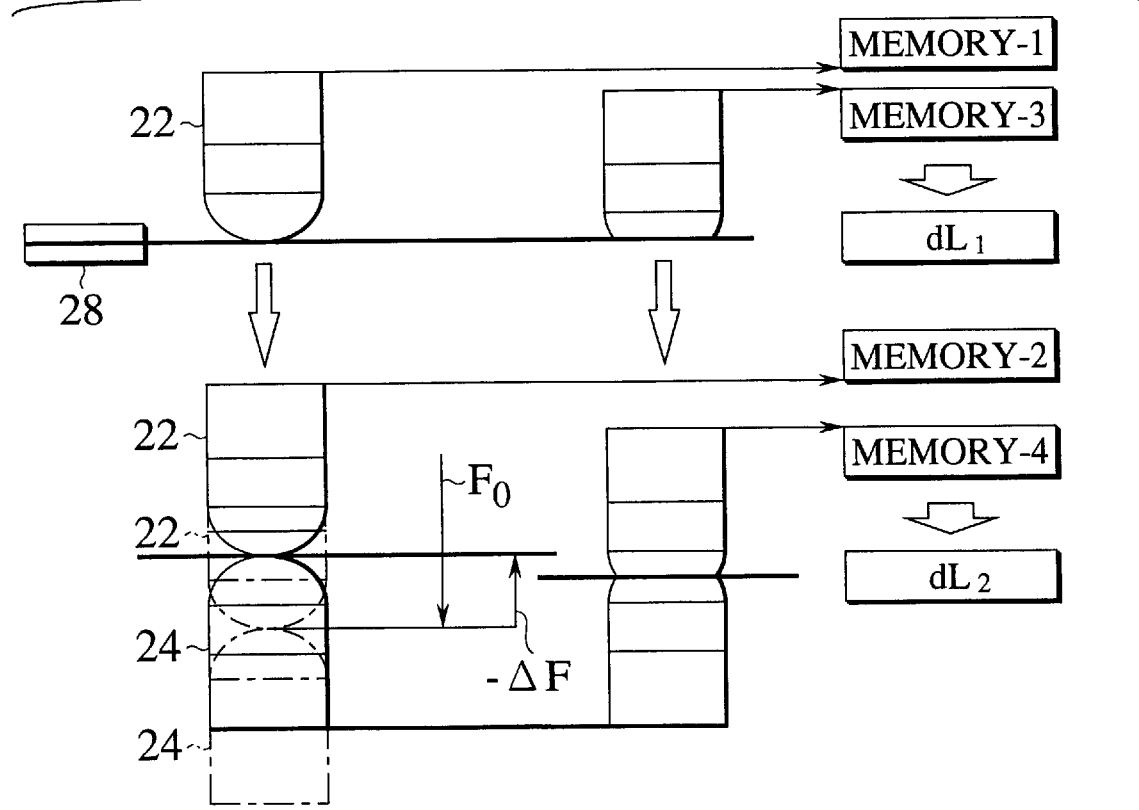
FIG. 5 is an illustration describing a data processing system to determine abrasion quantities of electrodes in the electrode position detecting system of FIG. 1.

At a step S3, the mobile electrode 22 is moved (by a distance Lr1) at a high speed until it contacts the stationary electrode 24, as shown in FIG. 5.

At a step S4, as the mobile electrode 22 is brought into contact with the stationary electrode 24, the former electrode 22 is pressed with a maximum pressing force F0 against the latter electrode 24 so that dressed tips 22b, 24b on the electrodes 22, 24 are fitted to ends.

At steps S5 to S7, output torque of the servo motor 26 is gradually reduced from the state of step S4, thereby decreasing the pressing force F0 of the mobile electrode 22, and when the pressing force F0 is lowered by Δ F to a zero, a contact point Zi1 (FIG. 13A) of the mobile electrode 22 is detected (as feed Fi1) and stored in another storage region of the memory 56 (hereafter called "memory-2").

As a result, the memory-i and memory-2 have stored therein data Fr1, Fi1 on positions Zr, Zi1 of tip ends of the unused mobile and stationary electrodes 22 and 24.

At a step S8, the servo motor 26 drives the mobile electrode 22 to return at a high speed to a home position, thereby releasing the arm spacing H (FIG. 1), i.e. rendering the spacing H full-open.

The foregoing steps S1 to S8 may preferably be performed twice, each time updating data in memory-1 and memory-2, to be responsible for a complete dressing of electrode tips.

After several spot welding operations through which the tip ends of the electrodes 22, 24 may have been worn and/or deformed, the control flow of flowchart goes through steps S9 to S11, where like steps to the steps S1 to S7 (or SS) are executed, having a data Fr2 (FIG. 13B) on a position Zr of the mobile electrode 22 detected by the end detector 28 and stored in a storage region of the memory 56 (hereafter called "memory-3") and a data Fi2 on a contact point Zi2 of the mobile electrode 22 stored in another storage region of the memory 56 (hereafter called "memory-4").

Then, at a step S12, the data stored in memory-1 to memory-4 are processed by the CPU 52 for calculation of abrasion dL1 and dL2 (FIG. 5) of the mobile and stationary electrodes 22 and 24, as follows.

Stored data in memory-1 to memory-4 are defined in terms of a feed (Fr1, Fi1, Fr2, Fi2 in FIGS. 13A and 13B) or displacement from the zero-feed point or the home position of the mobile electrode 22. Therefore, data (Fr2) in memory-3 is subtracted from data (Fr1) in memory-1 to determine an abrasion dL1 (=dZ1) of the mobile electrode 22, and data (Fi2) in memory-4 is subtracted from the data (Fr2) in memory-3 to determine a total abrasion dL1+dL2 of the mobile and stationary electrodes 22a and 24. Then, the abrasion dL1 of the mobile electrode 22 is subtracted from the total abrasion dL1+dL2 to determine an abrasion dL2 (=dZ2) of the stationary electrode 24.

At a step S13, the calculated abrasions dL1, dL2 are employed in the controller 50, e.g. for correction of a command C for positioning the mobile electrode 22, or correction of a (locus) teaching data to the robot R. In other words, to compensate for the abrasions dL1 and dL2, corrections are made of positional command data for a welding position of the mobile electrode 22 (to be pushed to a balancing point Zj in FIG. 10 in consideration of electrode abrasion) or for a locus to be prescribed by the robot R.

Such detection allows an electrode abrasion to be accurately detected in free of errors due to accumulation of a precise but repeated positioning, or a bending depending on mechanical rigidity and backlash of the robot R. A resultant accurate correction permits an improved welding quality. Even after tip replacement in a welding operation, the gun arm 20 is moved by the robot R merely for a minimized travel from the operation position to a place for power-free pressing, permitting a restoring time to be reduced. There are provided no dedicated space for installation of an extra abrasion detector, nor costs therefor.

The electrode tips 22b, 24b (FIG. 12) are consumable and each need a frequent replacement, where it is struck onto the tip adapter 22a or 24a. An insufficient fitting of a tip results in an undesirable change of an electrode length, as the tip may be driven on each time when pressed against an opposite tip, causing errors in detection of abrasion. The present embodiment can cope with the issue, as described.

Further, the electrode position detecting system 1 is applicable to a quantitative compensation of electrode position for a bending of the welding gun 2, permitting an accurate and quick detection of the bending.

Figure 6:
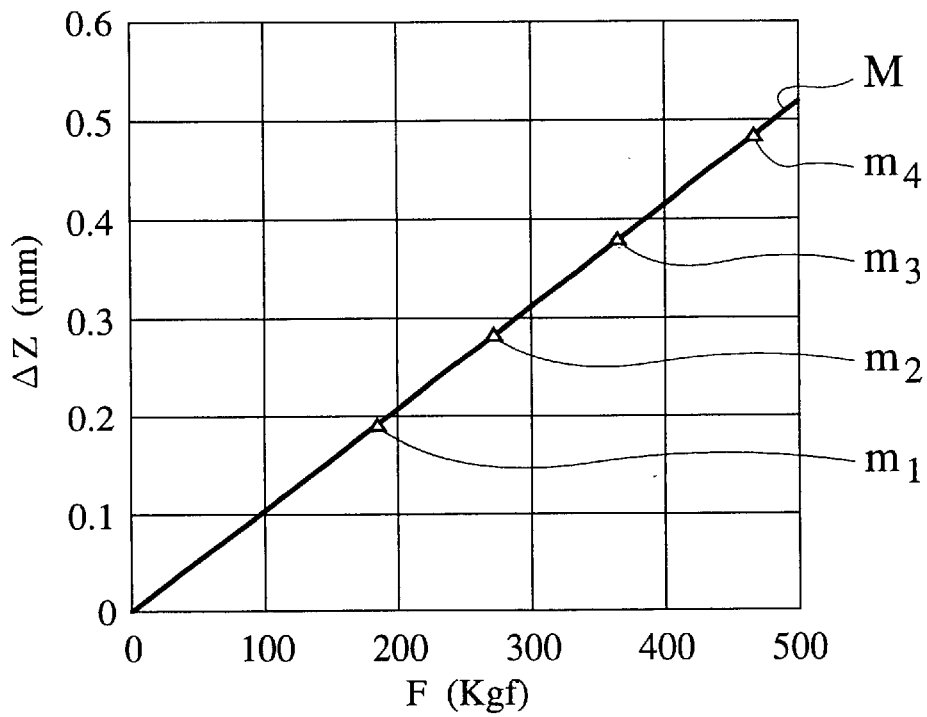
FIG. 6 is a graph of a varying gun bending in the electrode position detecting system of FIG. 1.

FIG. 6 is a graph of the gun bending observed in such an application of the system 1, in which the mobile electrode 22 was brought into abutment on the stationary electrode 24 a plurality of times, each time with a different pressing force F, each time having a combination of a pressing force data (F<200 Kg in a first time, F<300 Kg in a second time, F<400 Kg in a third time, and F<500 Kg in a fourth time) and a positional data ($\Delta Z$ under 0.2 mm in the first time, under 0.3 mm in the second time, under 0.4 mm in the third time, and under 0.5 mm in the fourth time) stored as a data set (m1, m2, m3 and m4) in the memory 56. A plurality of thus collected data sets were read in the CPU 52, where they were processed by a method of least squares combined with a first-order recurrence expression to estimate a first-order linear function M representative of a bending of the welding gun 2, such that A Z=M(F)=b1F+b2, where b1 is a constant as a gradient dM/dF, and b2 is a constant as a ($\Delta Z$)-intercept.

As the function M has a favorable linearity, at least two data sets may well be processed to determine the constants b1 and b2 for a particular case, in which the gun bending $\Delta Z$ for an arbitrary pressing force F may be estimated by an internal or external interpolation of data along an estimated straight line M and employed for correction of electrode position to compensate for the gun bending.

Figure 3:
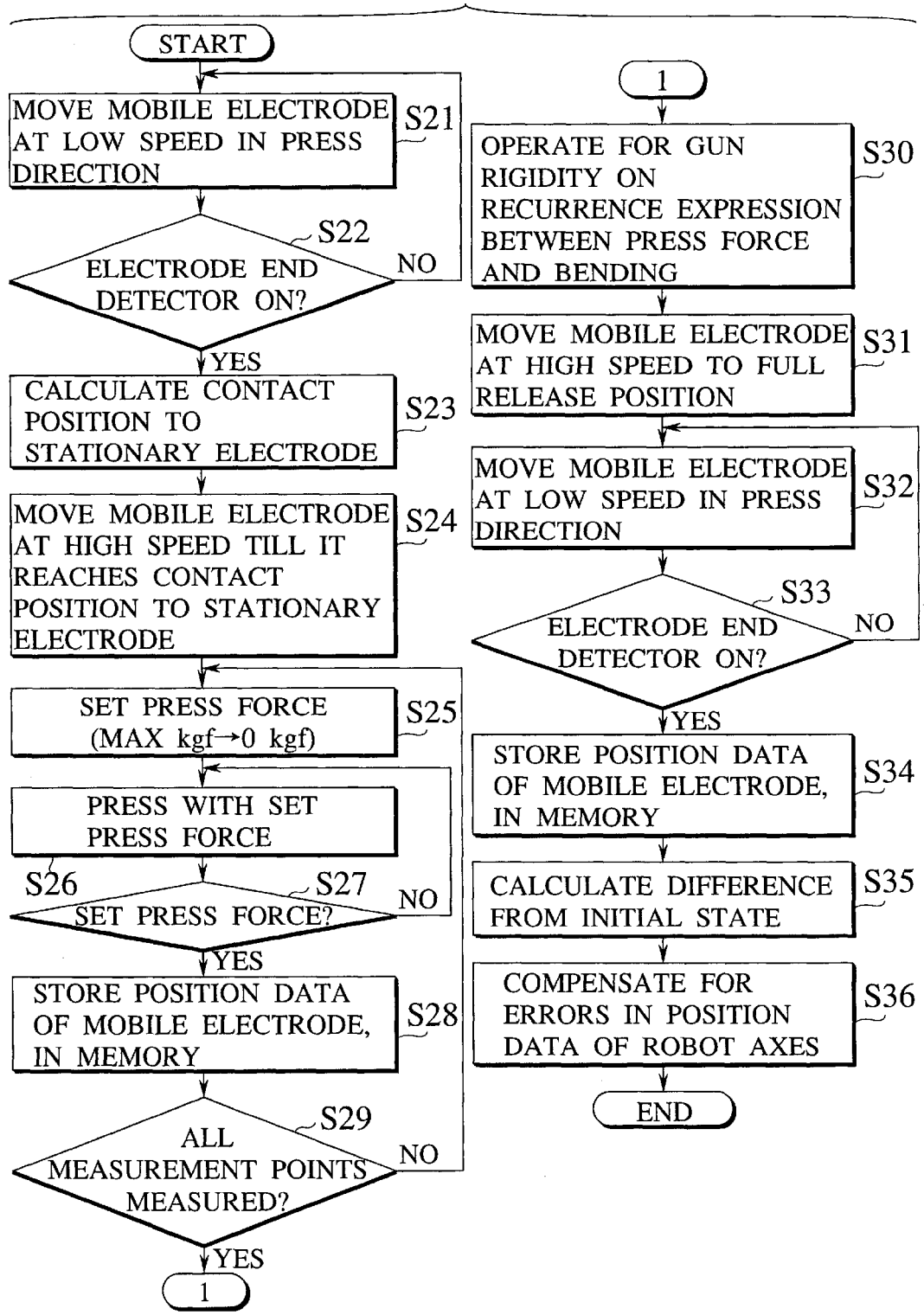
FIG. 3 is a flowchart of actions of the electrode position detecting system of FIG. 1, as it is employed for correction of electrode position to compensate for a bending of the welding gun.

FIG. 3 shows a flowchart of actions of the electrode position detecting system 1, as it is applied to an electrode position correction for gun bending compensation.

The welding gun 2 now has a (tip 22b on) mobile electrode 22 and a (tip 24b on) stationary electrode 24, which are not yet used for a welding. The CPU 52 now has a data Fr1 (FIG. 13A) on a sensed position Zi1 of the mobile electrode 22 obtained in a described manner (at the steps S1 and S2 of FIG. 2) and stored in memory-1, and a data Fi1 (FIG. 13A) on a zero-force contact point Zi1 obtained in a described manner (at the steps S3 to S8 of FIG. 2) and stored in memory-2. Therefore, the tips 22b and 24b have been fitted to ends (by the maximum pressing force F0 at the step S4).

At a step S21 of FIG. 3, a drive command C is output from the CPU 52 to the servo motor 26, with a command data defining a pressing force to be exerted by the mobile electrode 22. With the commend C given, the servo motor 26 moves the mobile electrode 22 at a low speed in a pressing direction.

At a step S22, a tip end of the mobile electrode 22 is sensed by the sensor 60 as an electrode end detector (at Zr).

At a step S23, calculation is made of a necessary additional feed Lr1 (FIG. 13A) for the mobile electrode 22 to reach the contact point Zi1.

At a step S24, the mobile electrode 22 is moved (by the feed Lr1) at a high speed until it contacts the stationary electrode 24.

At steps S25 to S27, as the mobile electrode 22 is brought into a zero-force contact with the stationary electrode 24, the former electrode 22 is driven to be pressed against the latter electrode 24 with a pressing force F (preset to be the maximum F0 in a first time, and to be stepwise reduced each time thereafter) so that, as shown in FIG. 10, the electrode 22 advances a little (by an extra feed $\Delta Z$) to stop at a pressing contact point Zj, where the pressing force F is balanced with a reaction force due to a bending of the gun arm 20.

At a step S28, the CPU 52 stores in the memory 56 a combination of a data (of a total feed Fi1+$\Delta Z$) on the pressing contact point (Zj) in combination with a data of the pressing force F (like m4 in FIG. 6).

At a step S29, the foregoing steps S25 to S28 are repeated one or more times, each time applying a (stepwise reduced) pressing force F changed from the first time, and storing in the memory 56 a data (Fi1+$\Delta Z$) on a varied contact point (Zj) in combination with a data of the changed pressing force F (like m3, m2 or m1 in FIG. 6).

At a step S30, stored data sets (on F and Zj) are read in the CPU 52, where they are processed to determine a rigidity of the welding gun 2 in terms of a gun bending function M (FIG. 6) or its constants b1 and b2, e.g. by use of a first-order recurrence expression, and resultant data are stored in the memory 56.

At a step S31, the servo motor 26 drives the mobile electrode 22 to return at a high speed to a home position.

After several spot welding operations, the control flow of flowchart goes through steps S32 to S34, where like steps to the steps S9 to S11 (i.e. S1 to S7 or S8) are executed, having a data Fr2 (FIG. 13B) on a position Zr of the mobile electrode 22 detected by the end detector 28 and stored in memory-3 and a data Fi2 (FIG. 13B) on a zero-force contact point Zi2 of the mobile and stationary electrodes 22 and 24 stored in memory-4.

At a step S35, the stored data (Fr1, Fi1, Fr2, Fi2 of FIGS. 13A and 13B) in memory-1 to memory-4 are processed by the CPU 52 for calculation of abrasion dL1 and dL2 (FIG. 5) of the mobile and stationary electrodes 22 and 24 in a described manner (like step S12 of FIG. 2).

At a step S36, the controller 50 employs the calculated abrasions dL1, dL2 in combination with the stored data on the gun rigidity (at the step S30), e.g. for correction of a command C for positioning the mobile electrode 22 or correction of a (locus) teaching data to the robot R in consideration a gun bending M that varies in dependence on a varied pressing force F. In other words, to compensate for the abrasions dL1 and dL2 of the electrodes 22 and 24 and the bending M of the welding gun 2 or gun arm 20, corrections are made of positional command data for a welding position of the mobile electrode 22 (to be pushed to a balancing point Zj in FIG. 10) or for a locus to be prescribed by the robot R.

Such a method makes an electrode tip fitted to an end, and allows an electrode abrasion to be accurately detected in free of errors due to a repeated abutment with a pressing force, permitting a detection of a gun bending and compensation therefor, in addition to that an optimal correction can be performed in consideration of a varied pressing force, permitting an enhanced welding quality.

As will be seen, the steps S21 to S31 of FIG. 3 may be executed between the steps S8 and S9 of FIG. 2. In this case, for a pressing force F to be employed in a subsequent welding operation, the extra feed ($\Delta Z$) or total feed (Fi1+$\Delta Z$) or the balance point Zj may be simply stored in the memory 26 and read for direct use in determination of an electrode feed in the welding operation.

The pressing force F is variable in dependence on an orientation of the welding gun 2 which has its distributed weight. For example, the pressing force F varies between a normal gun position in which the stationary electrode 24 on the arm end portion 20a bears a downward pressing force F from the mobile electrode 22 and a fraction of a load from the arm base portion 20b with the feed mechanism 30of, and an inverted gun position in which the stationary electrode 24 receives an upward pressing force from the mobile electrode 22.

Figure 7:
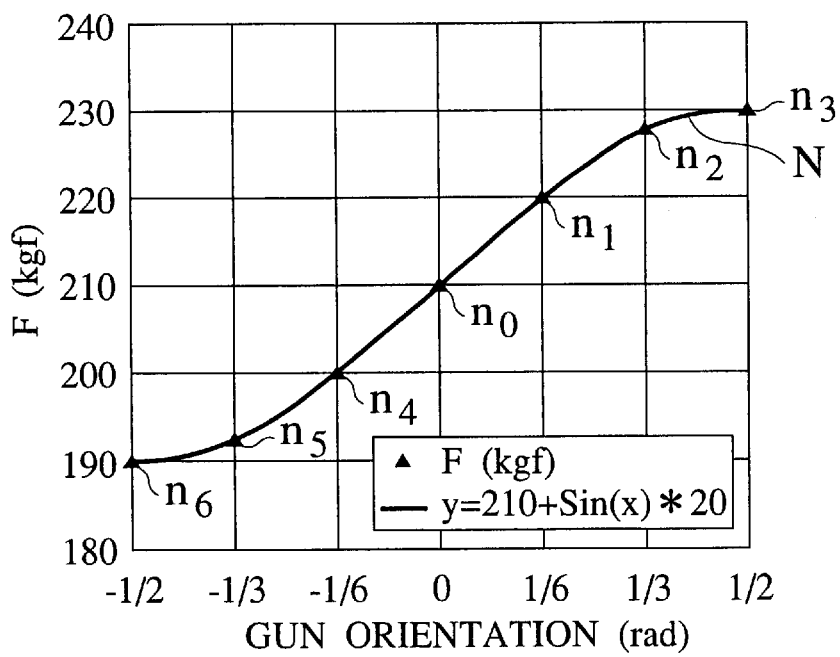
FIG. 7 is a graph of a varying pressing force in the electrode position detecting system of FIG. 1.

FIG. 7 shows a measured variation of the pressing force F in Kgf in dependence on an orientation of the welding gun 2 (20 Kg in weight) in radian about a horizontally set rotation axis of the robot arm.

The orientation was changed from a normal position of zero radian to a half radian at each opposite side, and seven data sets n0 to n6 were obtained. By use of a recurrence expression y=A sin(x)+B and a method of least squares, there was described a sine curve N, where 'y' is a gun bending, 'x' is a gun orientation, 'A' is a gun weight, and 'B' is a constant corresponding to a magnitude of effective torque T (FIG. 11).

The electrode position detecting system 1 of FIG. 1 is applicable to a correction of electrode position to be compensated in consideration of an orientation of the welding gun 2, as follows.

First, the welding gun 2 is set in a normal position in which the mobile electrode 22 has a feed direction Df oriented substantially in a downward sense of a vertical direction, and a first data on a bending of the gun 2 is detected in a described manner (at the steps S21 to S28 of FIG. 3) and stored in the memory 56.

Next, the welding gun 2 is set in an inverted position in which the mobile electrode 22 has a feed direction Df (FIG. 9) oriented substantially in an upward sense of the vertical direction, and a second data on a bending of the gun 2 is likewise detected and stored.

Then, the first and second data are read to the CPU 52, where they are processed by way of a recurrence calculation for a sine curve (y=A sin(x)+B) that has an upper limit corresponding to the first and second data, as the sine curve represents a component of a weight load to be imposed on a pressing contact point Zj (FIG. 4) in an arbitrary orientation of the gun 2.

Accordingly, in the welding, the pressing force F is corrected to compensate for the load component in accordance with a varied orientation of the gun 2, permitting a desirable pressing force to act on a welding spot, ensuring an enhanced welding quality.

In the embodiment, the CPU 52 employs the mobile electrode 22 as a reference scale for directly measuring an electrode abrasion and ensuring an electrode position, and calibrates the reference scale to effect a direct quantitative compensation for a bending of the welding gun 2 and a pressing force variation due to an orientation of the welding gun 2.

As will be seen from the foregoing description, the present embodiment allows an electrode abrasion to be accurately detected in free of errors due to a repeated positioning, a gun bending depending on a mechanical rigidity and backlashes of the robot. A resultant accurate correction permits an improved welding quality. Even after tip replacement in a welding operation, the gun arm can be moved by the robot merely for a minimized travel from the operation position to a place for a pressing without current conduction, permitting a restoring time to be reduced. There are needed no dedicated space for installation of an extra abrasion detector, nor costs therefor.

Moreover, the embodiment can cope with issues of available electrode tips which are consumable and each need a frequent replacement by a hitting, and of which fitting may be insufficient to be free from an undesirable change of an electrode length, as the tip may be driven on each time when pressed against an opposite tip, causing errors in detection of abrasion. The embodiment employs a maximum pressing force before a detection of electrode abrasion, achieving an in-depth fitting, permitting an accurate detection of electrode abrasion, eliminating detection errors due to a repeated pressing, resulting in an enhanced welding quality.

Further, the embodiment allows a quantitative compensation of electrode position for a gun bending, permitting an accurate and quick detection of the bending.

Furthermore, the embodiment allows for a precise correction of a pressing force to compensate for a load component in accordance with a varied gun orientation, permitting a desirable pressing force to act on a welding spot, ensuring an enhanced welding quality.

The entire contents of Japanese Patent Application P10-23335 (filed Feb. 4, 1998) are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. An electrode position detecting system for spot welders in which a welding robot manipulates a welding gun having a pair of relatively movable welding electrodes, the electrode position detecting system comprising:

a coordinate system fixed to a welding gun;

a sensor fixed to the coordinate system, the sensor sensing a mobile electrode moved in a position; and a position detector cooperative with the sensor to detect said position of the mobile electrode relative to the welding gun, wherein the sensor senses an end part of the mobile electrode, and said position of the mobile electrode represents a position of the end part of the mobile electrode relative to the welding gun.

2. The electrode position detecting system of claim 1, wherein:
the welding gun comprises
a feed mechanism feeding the mobile electrode in a feed direction, and
a gun arm having a base portion supporting the feed mechanism, and an end portion supporting another welding electrode in opposition to the mobile electrode; and
the sensor comprises
a projector fixed to the base portion of the gun arm, the projector projecting a beam crossing the feed direction of the mobile electrode, and
a receiver fixed to the base portion of the gun arm, the receiver receiving the beam from the projector.

3. The electrode position detecting system of claim 2, wherein the welding gun further comprises a bracket fastened to the base portion of the gun arm, the bracket comprising a pair of support pieces spaced from each other, one support piece supporting the projector, the other support piece supporting the receiver.

4. By The electrode position detecting system of claim 1, wherein the position detector comprises:
a feed mechanism fixed to the welding gun, the feed mechanism feeding the mobile electrode;
a servo motor driving the feed mechanism; and
a controller controlling the servo motor, the controller detecting said position of the mobile electrode.

5. The electrode position detecting system of clain 4, wherein the controller recognizes a pressure-less contact between the mobile electrode and a stationary electrode fixed to the welding gun.

6. The electrode position detecting system of claim 5, wherein:
the controller controls a feed of the feed mechanism; and
the controller recognizes
a first feed by which the mobile electrode is moved in said position before a spot welding between the mobile electrode and a stationary electrode fixed to the welding gun,
a second feed by which the mobile electrode is brought into the pressure-less contact before the spot welding,
a third feed by which the mobile electrode is moved in said position after the spot welding,
a fourth feed by which the mobile electrode is brought into the pressure-less contact after the spot welding, and
a deformation of one of the mobile electrode and the stationary electrode based on at least two of the first, the second, the third and the fourth feed.

7. The electrode position detecting system of claim 6, wherein the controller controls the feed of the feed mechanism on a basis of said deformation.

8. The electrode position detecting system of claim 8, wherein the controller controls the mobile electrode to exert a pressing force on the stationary electrode, before the mobile electrode enters the pressure-less contact.

9. The electrode position detecting system of claim 8, wherein one of the mobile electrode and the stationary electrode comprises:
an electrode member connected to the feed mechanism; and
an electrode tip dressed on the electrode member.

10. The electrode position detecting system of claim 8, wherein:
the controller controls a feed quantity of the feed mechanism; and
the controller recognizes
a first feed quantity by which the mobile electrode is brought into the pressure-less contact,
a second feed quantity by which the mobile electrode is moved to have the pressing force of a magnitude exerted on the stationary electrode and balanced by a reaction of the stationary electrode,
a third feed quantity by which the mobile electrode is moved to have the pressing force of a different magnitude exerted on the stationary electrode and balanced by a reaction of the stationary electrode, and
a bending of the welding gun based on the first, the second, and the third feed quantity.

11. The electrode position detecting system of claim 10, wherein the controller controls the feed quantity of the feed mechanism on a basis of said bending.

12. The electrode position detecting system of claim 10, wherein the controller recognizes a first bending of the welding gun having a first orientation, a second bending of the welding gun having a second orientation different from the first orientation, and an effect of an orientation of the welding gun on the bending of the welding gun based on the first and the second bending of the welding gun.

13. The electrode position detecting system of claim 12, wherein the controller controls the feed quantity of the feed mechanism on a basis of said effect.

14. An electrode position detecting system for spot welders in which a welding robot manipulates a welding gun having a pair of relatively movable welding electrodes, the electrode position detecting system comprising:
a coordinate system fixed to a welding gun;
sensor means fixed to the coordinate system, the sensor means sensing a mobile electrode moved in a position; and
position detector means cooperative with the sensor means to detect said position of the mobile electrode relative to the welding gun, wherein
the sensor means senses an end part of the mobile electrode; and
said position of the mobile electrode represents a position of the end part of the mobile electrode relative to the welding gun.

15. An electrode position detecting method for spot welders in which a welding robot manipulates a welding gun having a pair of relatively movable welding electrodes, the electrode position detecting method comprising:
having a coordinate system fixed to a welding gun;
fixing a sensor to the coordinate system;
sensing by the sensor a mobile electrode moved in a position; and
having a position detector cooperating with the sensor to detect said position of the mobile electrode relative to the welding gun, wherein
said sensing by the sensor includes sensing an end part of the mobile electrode; and
said position of the mobile electrode represents a position of the end part of the mobile electrode relative to the welding gun.

* * * * *